United States Patent
Maruyama et al.

(10) Patent No.: US 12,417,000 B2
(45) Date of Patent: Sep. 16, 2025

(54) CAPACITIVE TOUCH PANEL AND DISPLAY DEVICE

(71) Applicant: Sharp Display Technology Corporation, Kameyama (JP)

(72) Inventors: Takenori Maruyama, Kameyama (JP); Kazutoshi Kida, Kameyama (JP); Shinji Yamagishi, Kameyama (JP); Takuma Yamamoto, Kameyama (JP); Yasuhiro Sugita, Kameyama (JP); Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/219,747

(22) Filed: Jul. 10, 2023

(65) Prior Publication Data

US 2024/0028168 A1    Jan. 25, 2024

(30) Foreign Application Priority Data

Jul. 19, 2022  (JP) .................................. 2022-115046

(51) Int. Cl.
*G06F 3/044* (2006.01)

(52) U.S. Cl.
CPC .......... *G06F 3/0443* (2019.05); *G06F 3/0446* (2019.05); *G06F 2203/04105* (2013.01)

(58) Field of Classification Search
CPC ................. G06F 3/0443; G06F 3/0446; G06F 2203/04105; G06F 3/0412; G06F 3/0445; G06F 3/04166; G06F 2203/04106; G06F 3/04164; G06F 2203/04112; G06F 3/044; G06F 3/0447; G06F 2203/04108; G06F 2203/04107; G06F 2203/04104; G06F 2203/04111; G06F 3/03545; G06F 3/0418; G06F 3/045; G06F 3/0448; G06F 3/016; G06F 3/04144; G06F 3/041662

See application file for complete search history.

(56) References Cited

U.S. PATENT DOCUMENTS

| | | | |
|---|---|---|---|
| 10,928,941 B2 * | 2/2021 | Lee ........................ | G06F 3/044 |
| 2016/0342256 A1 * | 11/2016 | Zhou ................. | G02F 1/134309 |
| 2017/0293381 A1 * | 10/2017 | Lee ........................ | G06F 3/0443 |
| 2017/0300163 A1 * | 10/2017 | Huang .................. | G06F 3/0412 |
| 2019/0317641 A1 * | 10/2019 | Maruyama ............ | G06F 3/0446 |
| 2020/0089369 A1 * | 3/2020 | Bang ..................... | G06F 3/0416 |
| 2021/0255737 A1 | 8/2021 | Kida et al. | |

FOREIGN PATENT DOCUMENTS

JP            2021128511 A       9/2021

* cited by examiner

*Primary Examiner* — Sujit Shah

(74) *Attorney, Agent, or Firm* — ScienBiziP, P.C.

(57) ABSTRACT

A touch panel includes: a drive electrode supplied with a drive signal; a position detecting electrode detecting a position included in a touch surface and touched with a pointing object, and a pressure detecting electrode detecting pressure applied on the touch surface with the pointing object, the position detecting electrode and the pressure detecting electrode being disposed across the drive electrode from the touch surface; and a floating electrode having a floating potential. The position detecting electrode, the pressure detecting electrode, and the floating electrode are formed in a layer.

7 Claims, 12 Drawing Sheets

|  | EXAMPLE OF FIRST EMBODIMENT | FIRST COMPARATIVE EXAMPLE |
|---|---|---|
| Cb | 0.8 pF | 0.7 pF |
| Cc | 1.4 pF | 1.0 pF |
| Cd | 2.4 pF | 3.9 pF |
| TOTAL | 4.6 pF | 5.6 pF |

FIG. 11

|        | EXAMPLE OF SECOND EMBODIMENT | FIRST COMPARATIVE EXAMPLE |
|--------|------------------------------|---------------------------|
| Cb     | 1.1 pF                       | 0.7 pF                    |
| Cc     | 1.1 pF                       | 1.0 pF                    |
| Cd     | 2.7 pF                       | 3.9 pF                    |
| TOTAL  | 4.9 pF                       | 5.6 pF                    |

FIG. 14

|  | EXAMPLE OF THIRD EMBODIMENT | SECOND COMPARATIVE EXAMPLE |
|---|---|---|
| Cb | 0.8 pF | 0.8 pF |
| Cc | 2.4 pF | 4.6 pF |
| Cd | 0.2 pF | 0.2 pF |
| TOTAL | 3.4 pF | 5.6 pF |

CAPACITIVE TOUCH PANEL AND DISPLAY DEVICE

CROSS-REFERENCE TO RELATED APPLICATIONS

This application claims the benefit of priority to Japanese Patent Application Number 2022-115046 filed on Jul. 19, 2022. The entire contents of the above-identified application are hereby incorporated by reference.

TECHNICAL FIELD

The present disclosure relates to a capacitive touch panel and a display device.

BACKGROUND ART

A conventionally known capacitive touch panel includes a pressure detecting electrode and a position detecting electrode. Such a capacitive touch panel is disclosed in, for example, Japanese Unexamined Patent Application Publication No. 2021-128511.

The capacitive touch panel disclosed in Japanese Unexamined Patent Application Publication No. 2021-128511 includes: a drive electrode formed on a first substrate; a position sensing electrode formed on a second substrate; and a pressure sensing electrode. On this capacitive touch panel, a pointing object is capacitively coupled to the drive electrode and the position sensing electrode. As a result, an electrostatic capacitance between the drive electrode and the position sensing electrode decreases, and a signal from the position sensing electrode changes. In accordance with the change of the signal from the position sensing electrode, a position of the pointing object is detected. Moreover, when the capacitive touch panel is pressed with the pointing object, and a distance between the drive electrode and the pressure sensing electrode decreases, the electrostatic capacitance between the drive electrode and the pressure sensing electrode increases. Accordingly, a signal from the pressure sensing electrode changes. Thus, in accordance with the change of the signal from this pressure sensing electrode, a magnitude of the pressure is detected.

SUMMARY

Technical Problem

Here, in the capacitive touch panel including the position detecting function and the pressure detecting function described in Japanese Unexamined Patent Application Publication No. 2021-128511, an electrostatic capacitance is formed between the drive electrode and the position sensing electrode, and additionally between the drive electrode and the pressure sensing electrode. Moreover, the position sensing electrode and the pressure sensing electrode are formed in the same layer (hereinafter referred to as a "layer in which a detection electrode is formed"). As a result, compared with a capacitive touch panel having no pressure detecting function, the capacitive touch panel of Japanese Unexamined Patent Application Publication No. 2021-128511 exhibits an increase in the electrostatic capacitance between the drive electrode and an electrode that is formed in the layer in which a detection electrode is formed. This inevitably results in an increase in a time constant of a drive signal to be supplied to the drive electrode, which might take a long response time to detect the touch and the pressure (might cause poor response characteristics).

Therefore, the present disclosure is intended to solve the above problems and to provide a capacitive touch panel and a display device having a pressure detecting function capable of preventing an increase in an electrostatic capacitance between a drive electrode and an electrode that is formed in a layer in which a detection electrode is formed.

Solution to Problems

In order to solve the above problems, a capacitive touch panel according to a first aspect of the present disclosure detects: a position included in a touch surface and touched with a pointing object; and pressure applied on the touch surface with the pointing object. The capacitive touch panel includes: a drive electrode supplied with a drive signal; a detection electrode disposed across the drive electrode from the touch surface, and including a position detecting electrode that detects the position included in the touch surface and touched with the pointing object, and a pressure detecting electrode that detects the pressure applied on the touch surface with the pointing object; and a floating electrode having a floating potential. The position detecting electrode, the pressure detecting electrode, and the floating electrode are formed in a layer.

Moreover, a display device according to a second aspect includes: a capacitive touch panel that detects: a position included in a touch surface and touched with a pointing object; and pressure applied on the touch surface with the pointing object; and a display that displays an image. The capacitive touch panel includes: a drive electrode supplied with a drive signal; a detection electrode disposed across the drive electrode from the touch surface, and including a position detecting electrode that detects the position included in the touch surface and touched with the pointing object, and a pressure detecting electrode that detects the pressure applied on the touch surface with the pointing object; and a floating electrode having a floating potential. The position detecting electrode, the pressure detecting electrode, and the floating electrode are formed in a layer.

Advantageous Effects

According to the above configuration, the floating electrode having a floating potential is formed in the same layer as a layer in which a detection electrode is formed. Between the drive electrode and the floating electrode, an electrostatic capacity is less likely to be formed. Hence, even if the capacitive touch panel has a pressure detecting function, such a feature makes it possible to prevent the electrostatic capacity from increasing between the drive electrode and an electrode that is formed in the layer in which a detection electrode is formed.

BRIEF DESCRIPTION OF DRAWINGS

FIG. 11 is a table showing a result of comparison between the display device 300 according to an example of the second embodiment and the display device 200 according to the first comparative example.

FIG. 14 is a table showing a result of comparison between the display device 400 according to an example of the third embodiment and the display device 500 according to the second comparative example.

DESCRIPTION OF EMBODIMENTS

Figure 1:
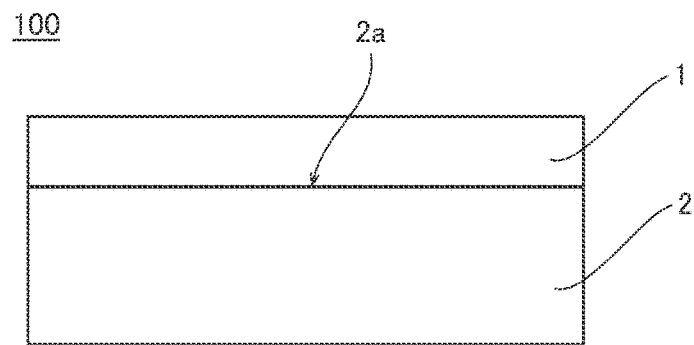
FIG. 1 is a cross-sectional view of a schematic configuration of a display device 100 according to a first embodiment.

Embodiments of the present disclosure will be described below with reference to the drawings. Note that the present disclosure shall not be limited to the embodiments below, and the designs presented in the embodiments can be appropriately modified within a scope of the configurations of the present disclosure. Moreover, identical reference signs are used to denote identical or substantially identical components among the drawings. Such components will not be repeatedly elaborated upon. Furthermore, the configurations described in the embodiments and in a modification thereof may be appropriately combined or modified unless otherwise departing from the scope of the present disclosure. For the sake of convenience, the drawings below are simplistically or schematically illustrated. In the drawings, some of the constituent members may be omitted. In addition, the dimensional ratios between the constituent members in the drawings are not necessarily the actual dimensional ratios.

First Embodiment (Configuration of Display Device)

FIG. 1 is a cross-sectional view of a schematic configuration of a display device 100 according to a first embodiment. The display device 100 includes: a touch panel 1; and a display unit 2 that displays an image on a display surface 2a. The display unit 2 is, for example, a liquid crystal display or an organic electroluminescence (EL) display.

(Configuration of Touch Panel)

Figure 2:
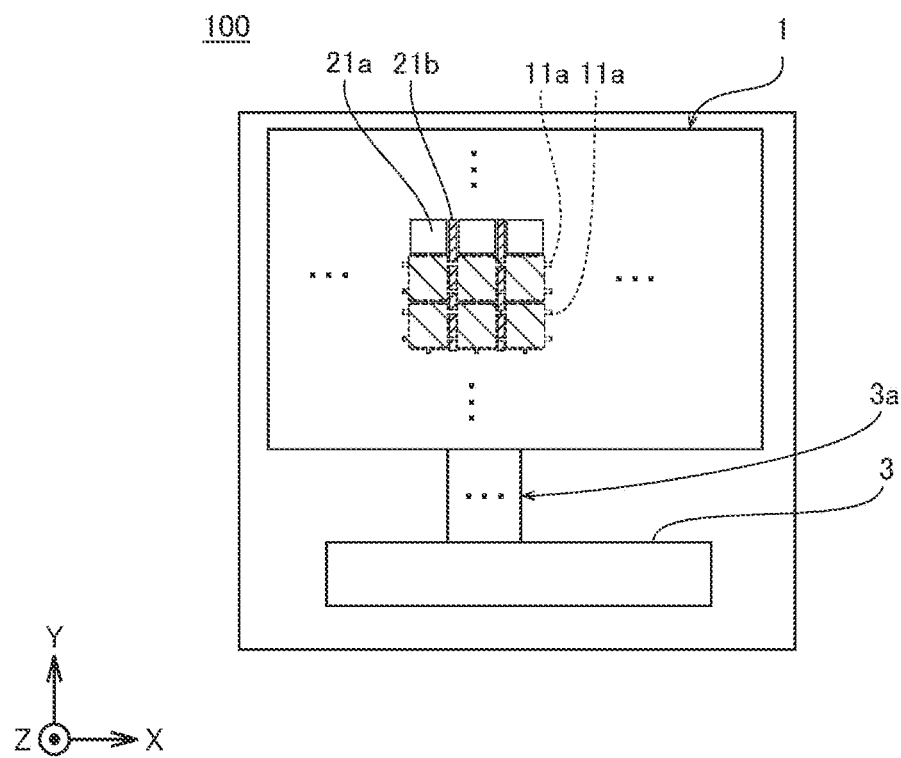
FIG. 2 is a schematic plan view of a configuration of the display device 100 according to the first embodiment.

FIG. 2 is a schematic plan view of a configuration of the display device 100 according to the first embodiment. The display device 100 includes a touch panel 1 that detects a position touched with a pointing object, a position pressed with the pointing object, and a magnitude of the pressure. As illustrated in FIG. 2, the touch panel 1 includes: a plurality of drive electrodes 11a; a plurality of pressure detecting electrodes 21a; and a plurality of position detecting electrodes 21b. The touch panel 1 is a mutual capacitive touch panel that detects a change in capacitance between the plurality of drive electrodes 11a and either the plurality of pressure detecting electrodes 21a or the plurality of position detecting electrodes 21b. Moreover, the display device 100 includes a touch panel controller 3. The touch panel controller 3 is connected through wires 3a to each of the plurality of drive electrodes 11a, the plurality of pressure detecting electrodes 21a, and the plurality of position detecting electrodes 21b. The touch panel controller 3 is, for example, an integrated circuit.

Figure 3:
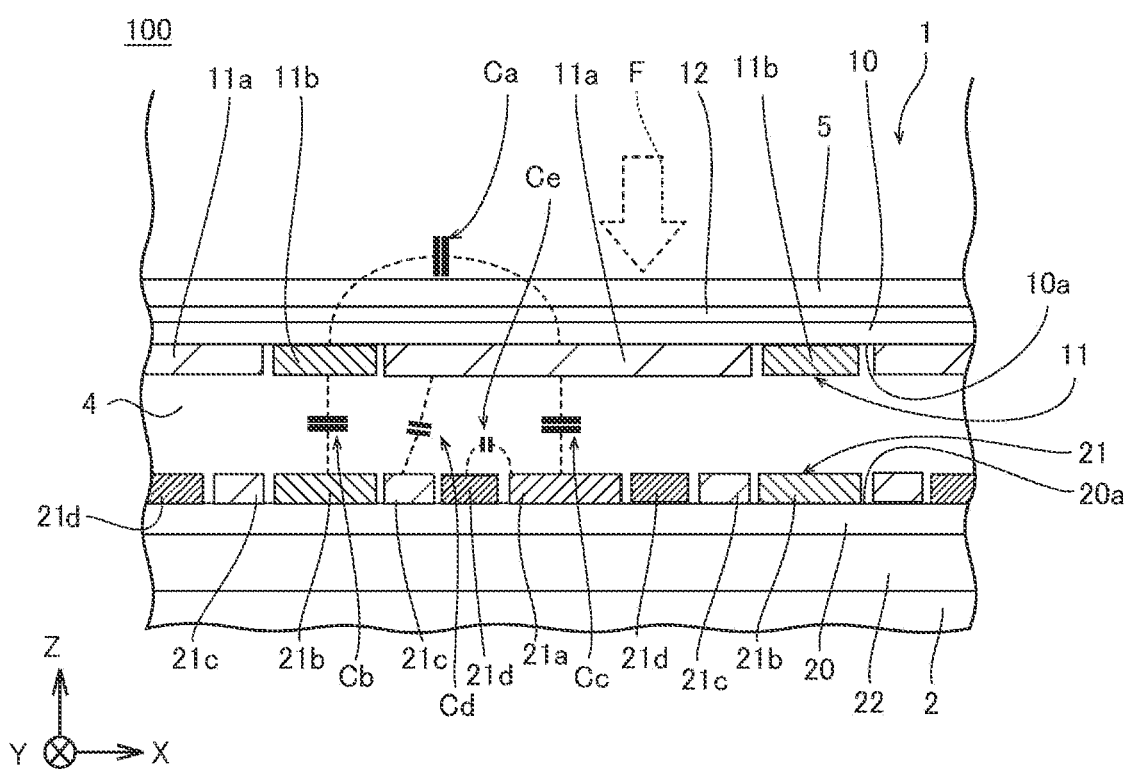
FIG. 3 is a cross-sectional view of a touch panel 1 according to the first embodiment.

FIG. 3 is a cross-sectional view of the touch panel 1 according to the first embodiment. As illustrated in FIG. 3, the touch panel 1 includes: a first substrate 10; a pressure-sensitive layer 4; and a second substrate 20. The first substrate 10, the pressure-sensitive layer 4, and the second substrate 20 are stacked on top of another. For example, the first substrate 10 and the second substrate 20 are formed of a transparent resin material such as polyethylene terephthalate (PET). Moreover, the pressure-sensitive layer 4 is a dielectric film containing a dielectric material. Furthermore, the pressure-sensitive layer 4 is made of an elastic transparent pressure-sensitive material such as a polymer material. Then, the touch panel 1 includes a cover member 5. The cover member 5 is made of, for example, a glass material. Moreover, an optical clear adhesive (OCA) layer 12 is disposed between the first substrate 10 and the cover member 5. A surface (a touch surface) of the cover member 5 is touched and pressed with the pointing object. The OCA layer 12 bonds the cover member 5 and the first substrate 10 together. Furthermore, an OCA layer 22 is disposed between the second substrate 20 and the display unit 2.

As illustrated in FIG. 3, the touch panel 1 includes: a drive electrode layer 11; and a detection electrode layer 21. The drive electrode layer 11 is formed on a surface 10a of the first substrate 10 toward the pressure-sensitive layer 4. The detection electrode layer 21 is formed on a surface 20a of the second substrate 20 toward the pressure-sensitive layer 4. That is, the detection electrode layer 21 is disposed across the drive electrode layer 11 from the touch surface. The drive electrode layer 11 includes: the drive electrodes 11a; and drive floating electrodes 11b. The detection electrode layer 21 includes: the position detecting electrodes 21b; the pressure detecting electrodes 21a; reference potential electrodes 21c; and floating electrodes 21d. Moreover, the drive electrodes 11a, the drive floating electrodes 11b, the position detecting electrodes 21b, the pressure detecting electrodes 21a, the reference potential electrodes 21c, and the floating electrodes 21d are made of a transparent conductive material such as indium tin oxide (ITO). Furthermore, the reference potential electrodes 21c are connected to a not-shown ground, and the potential of the reference potential electrodes 21c is equal to the potential of the ground. Each of the drive floating electrodes 11b and the floating electrodes 21d is not connected to another electrode, not connected to a voltage source (e.g., the touch panel controller 3), or not connected to the ground. Each of the drive floating electrodes 11b and the floating electrodes 21d has a floating potential. The floating potential is a potential that varies depending on the surrounding electric field because the floating potential is not connected to another conductive member.

As illustrated in FIG. 3, a pressure detecting electrode 21a is positioned to overlap with a drive electrode 11a in plan view. Moreover, at least a portion of a position detecting electrode 21b is positioned not to overlap with the drive electrodes 11a in plan view. A floating electrode 21d is positioned to overlap with the drive electrode 11a in plan view. Furthermore, the position detecting electrode 21b is positioned to overlap with a drive floating electrode 11b in plan view. In addition, the floating electrode 21d is positioned not to overlap with the drive floating electrode 11b in plan view. Moreover, in the first embodiment, a reference potential electrode 21c is disposed between the floating electrode 21d and the position detecting electrode 21b.

The drive electrode 11a is supplied with a drive signal from the touch panel controller 3 (see FIG. 2). Moreover, as illustrated in FIG. 3, the drive floating electrode 11b forms a capacitance Ca (an electrostatic capacitance of a fringe component) between the drive floating electrode 11b and the drive electrode 11a. The position detecting electrode 21b is an electrode for detecting a position touched with the pointing object. The position detecting electrode 21b forms a capacitance Cb between the position detecting electrode 21b and the drive floating electrode 11b. The pressure detecting electrode 21a is an electrode for detecting presence or absence of, and a magnitude of, the pressure applied with the pointing object. The pressure detecting electrode 21a forms a capacitance Cc between the pressure detecting electrode 21a and the drive electrode 11a. The reference potential electrode 21c has a ground potential of the touch panel 1. The reference potential electrode 21c forms a capacitance Cd between the reference potential electrode 21c and the drive electrode 11a. Here, if the drive floating electrode and the pressure detecting electrode are capacitively coupled together, the capacitance inevitably changes just because the pointing object touches the touch panel even if the touch panel is not pressed by the pointing object. In this case, it is difficult to distinguish the capacitance change caused merely by a touch of the pointing object from the capacitance change caused by a press of the pointing object. On the other hand, according to the configuration of the first embodiment, the reference potential electrode 21c can prevent capacitive coupling between the drive floating electrode 11b and the pressure detecting electrode 21a. Hence, the drive electrode 11a and the pressure detecting electrode 21a exhibit the capacitance change only when the touch panel 1 is pressed. As a result, according to the first embodiment, it is possible to accurately distinguish the capacitance change caused merely by a touch of the pointing object from the capacitance change caused by a press of the pointing object. The floating electrode 21d forms a capacitance Ce (an electrostatic capacitance of a fringe component) between the floating electrode 21d and the pressure detecting electrode 21a.

Thanks to the above features, an electrostatic capacitance is less likely to be formed between the drive electrode 11a and the floating electrode 21d. Compared with a case where the entire detection electrode layer is composed only of position detecting electrodes, pressure detecting electrodes, and the reference potential electrodes, the features can reduce an electrostatic capacitance between the drive electrode 11a and an electrode formed in the detection electrode layer 21. As a result, the touch panel 1 having a pressure detecting function can prevent an increase in the electrostatic capacitance between the drive electrode 11a and the electrode formed in the detection electrode layer 21. This successfully prevents an increase in a time constant of a drive signal to be supplied to the drive electrode 11a, and a delay of a response time to detect the touch and the pressure (poor response characteristics).

Moreover, the pressure detecting electrode 21a, the reference potential electrode 21c, and the drive electrode 11a constitute a parallel plate capacitor. The position detecting electrode 21b and the drive electrode 11a form an electrostatic capacitance (an electrostatic capacitance of a fringe component) between an end portion of the drive electrode 11a and the position detecting electrode 21b. An electrostatic capacitance formed by the parallel plate capacitor is larger than the electrostatic capacitance of the fringe component. On the other hand, thanks to the above configuration, at least a portion of an electrode, included in the detection electrode layer 21 and positioned to overlap with the drive electrode 11a in plan view, acts as the floating electrode 21d. Such a feature can reduce the size of the parallel plate capacitor. As a result, the feature can prevent an increase in the electrostatic capacitance between the drive electrode 11a and an electrode formed in the detection electrode layer 21.

Moreover, as described above, the drive electrode 11a and the drive floating electrode 11b are capacitively coupled, and the drive floating electrode 11b and the position detecting electrode 21b are capacitively coupled. Thanks to such a feature, even if the drive electrode 11a and the position detecting electrode 21b are positioned not to overlap with each other in plan view, the drive electrode 11a and the position detecting electrode 21b can form an electrostatic capacitance through the drive floating electrode 11b. As a result, the feature can increase the intensity of a signal for detecting the touch position based on the electrostatic capacitance. Moreover, the floating electrode 21d is positioned not to overlap with the drive floating electrode 11b in plan view, such that the position detecting electrode 21b can be formed in a large size and positioned to overlap with the floating electrode 11b in plan view. These features make it possible to reduce a difference between the intensity of a signal from the pressure detecting electrode 21a and the intensity of a signal from the position detecting electrode 21b, so that the intensity of the signal from the pressure detecting electrode 21a and the intensity of the signal from the position detecting electrode 21b can be easily adjusted on the touch panel controller 3.

Figure 4:
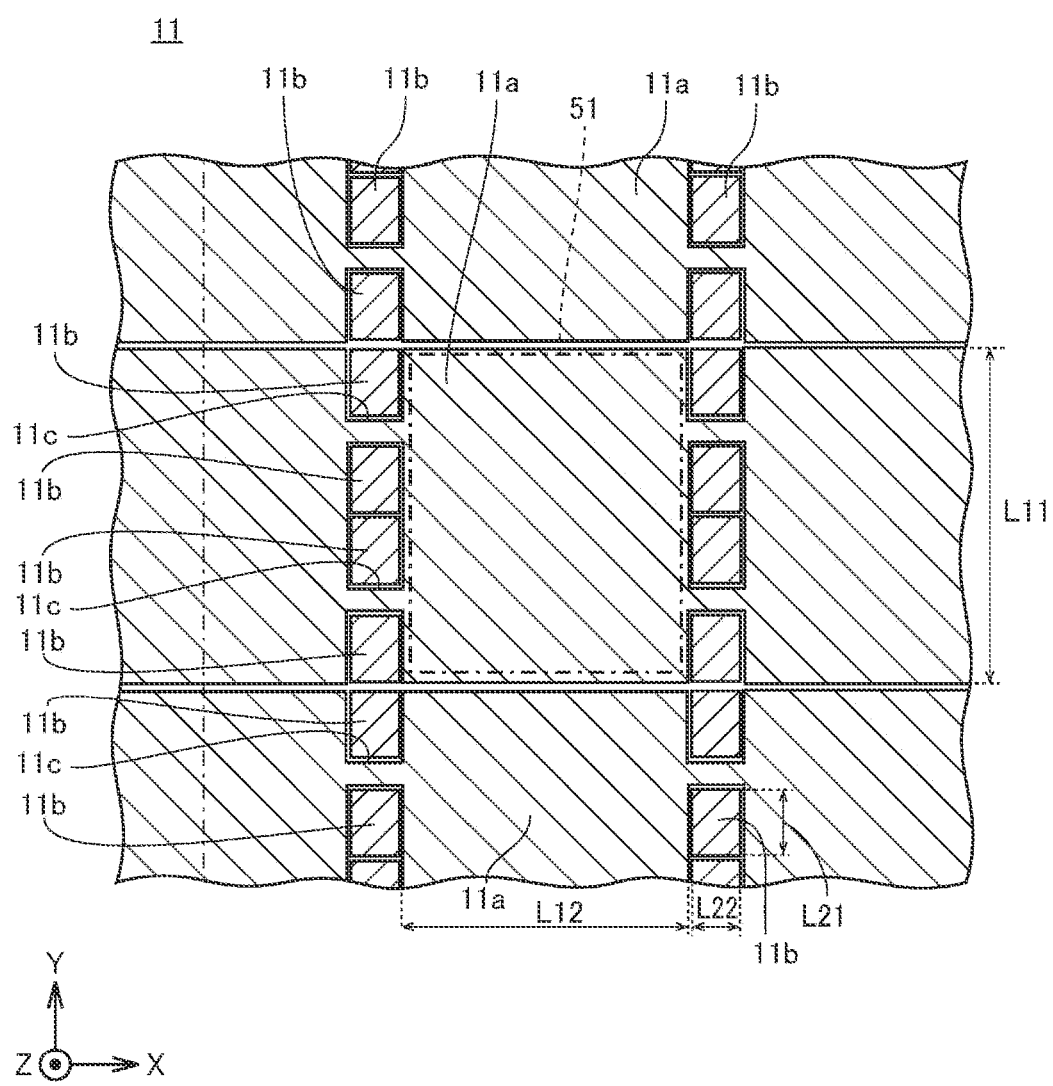
FIG. 4 is a plan view of a portion of a drive electrode layer 11.

FIG. 4 is a plan view of a portion of the drive electrode layer 11. As illustrated in FIG. 4, the drive electrode 11a includes a plurality of electrode units 51 shaped into rectangles and connected together in a horizontal direction (in an X-direction) on the drawing. The two adjacent electrode units 51 are connected by, for example, two connecting portions 11c extending in the X-direction. Each of the plurality of drive floating electrodes 11b is not connected to another drive floating electrode 11b. Each drive floating electrode 11b is a rectangle electrode. The drive floating electrode 11b is disposed in the X-direction between two adjacent electrode units 51. Moreover, between two connection portions 11c in the Y direction, two drive floating electrodes 11b are arranged. A length L22 of each drive floating electrode 11b in the X-direction is shorter than a length L12 of each electrode unit 51 in the X-direction. A length L21 of each drive floating electrode 11b in a Y-direction is shorter than a length L11 of each electrode unit 51 in the Y-direction. Furthermore, as illustrated in FIGS. 2 and 3, the drive electrode 11a is positioned to overlap with the pressure detecting electrode 21a, the reference potential electrode 21c, and the floating electrode 21d in plan view. In addition, the drive floating electrode 11b is positioned to overlap with the position detecting electrode 21b in plan view. Moreover, as illustrated in FIG. 4, each of the plurality of electrode units 51 is larger in area than a drive floating electrode 11b.

Figure 5:
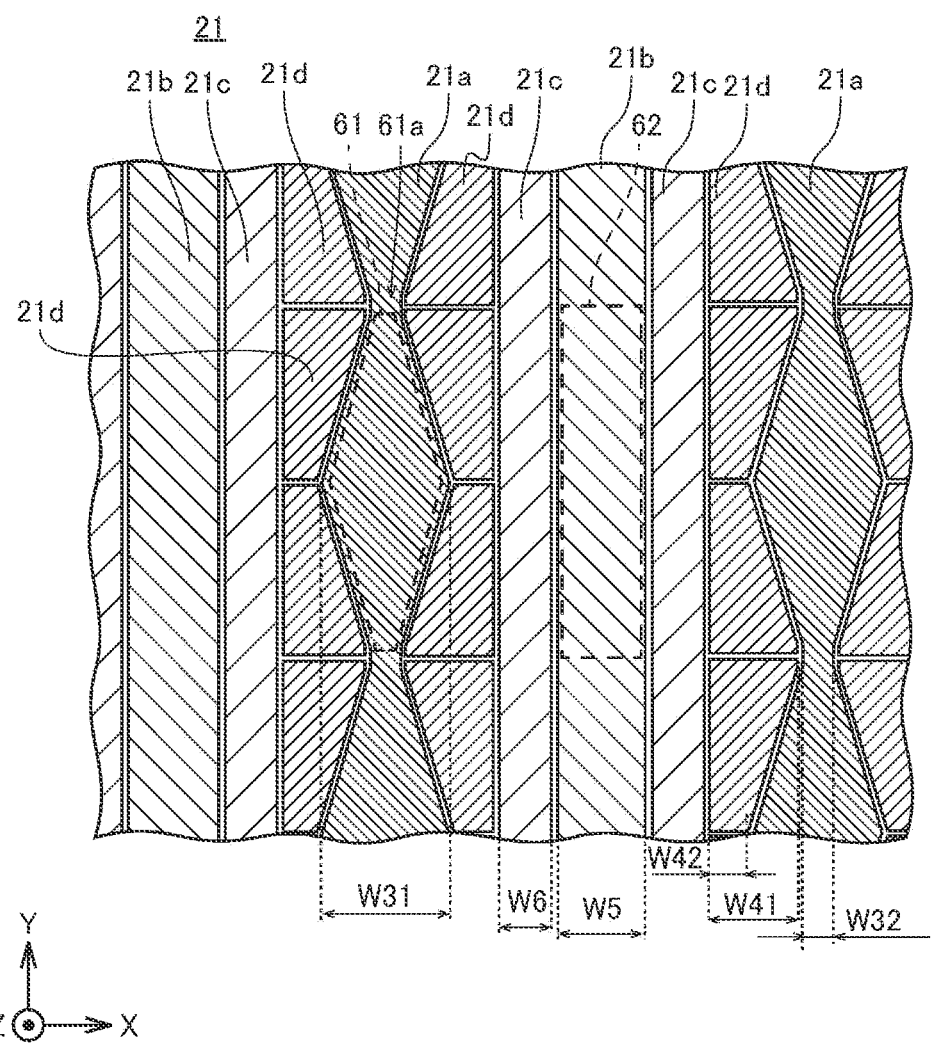
FIG. 5 is a plan view of a portion of a detection electrode layer 21.

FIG. 5 is a plan view of a portion of the detection electrode layer 21. As illustrated in FIG. 5, in the detection electrode layer 21, the pressure detecting electrodes 21a and the position detecting electrodes 21b are alternately arranged in the horizontal direction (in the X-direction) on the drawing. Each of the plurality of pressure detecting electrodes 21a and the plurality of position detecting electrodes 21b extends in the vertical direction (in the Y-direction) on the drawing. Moreover, between a pressure detecting electrode 21a and a position detecting electrode 21b, a reference potential electrode 21c is formed.

Furthermore, as illustrated in FIG. 5, each of the plurality of pressure detecting electrodes 21a includes a plurality of pressure detecting units 61 arranged side by side in the Y-direction. Each of the plurality of the pressure detecting units 61 in the first embodiment is shaped into a substantially rhombic hexagon. The plurality of pressure detecting units 61 each independently detect pressure of the pointing object. Each of the plurality of pressure detecting units 61 corresponds to one of the pressure positions (pressure coordinates) to be detected by the touch panel controller 3. In other words, each pressure detecting unit 61 represents one of the pressure coordinates (a unit cell). Two adjacent pressure detecting units 61 in the Y-direction are connected by a connection portion 61a. In the X-direction, the pressure detecting unit 61 has a largest width; namely a width W31, and a smallest width; namely, a width W32. Moreover, the width of the connecting portion 61a is equal to the smallest width of the pressure detecting unit 61.

Furthermore, each of the plurality of position detecting electrodes 21b includes a plurality of position detecting units 62 arranged side by side in the Y-direction. The plurality of position detecting units 62 each independently detect a position touched with the pointing object. Each of the plurality of position detecting units 62 corresponds to one of the touched positions (touch coordinates) to be detected by the touch panel controller 3. In other words, each position detecting unit 62 represents one of the touched position coordinates (a unit cell). Each position detecting unit 62 is shaped into a rectangle in plan view. In the X-direction, the position detecting unit 62 has a width of W5. For example, the width W5 is larger than the width W32 and smaller than the width W31.

Moreover, the plurality of reference potential electrodes 21c extend in the Y-direction along the position detecting electrodes 21b. The plurality of reference potential electrodes 21c are arranged between the floating electrodes 21d and the position detecting electrodes 21b in plan view. Furthermore, the plurality of reference potential electrodes 21c are arranged to sandwich the position detecting electrodes 21b in plan view. For example, each of the reference potential electrodes 21c has a constant width W6. The width W6 is smaller than, for example, the width W5.

Moreover, the plurality of floating electrodes 21d are disposed between the pressure detecting electrodes 21a and the reference potential electrodes 21c. Each of the plurality of floating electrodes 21d in the first embodiment is shaped into a trapezoid. Furthermore, the plurality of floating electrodes 21d are arranged side by side in the Y-direction. In addition, each of the plurality of floating electrodes 21d is not connected to another floating electrode 21d. Moreover, in the X-direction, each floating electrode 21d has a largest width; namely, a width W41, and a smallest width; namely, a width W42. For example, the width W41 is larger than the width W6 and smaller than the width W31. In addition, the width W42 is smaller than the width W5 and larger than the width W32.

(Operation of Touch Panel 1)

Next, an operation of the touch panel 1 will be described, with reference to FIG. 3. As illustrated in FIG. 3, a drive floating electrode 11b forms the capacitance Cb between the drive floating electrode 11b and a position detecting electrode 21b. When a pointing object F comes into contact with the cover member 5, the pointing object F is capacitively coupled to each of the drive floating electrode 11b and a drive electrode 11a. As a result, the electrostatic capacitances (Ca and Cb) between the drive electrode 11a and the position detecting electrode 21b decrease through the pointing object F and the drive floating electrode 11b, and the signal detected by the position detecting electrode 21b (a position detecting unit 62) changes. The touch panel controller 3 detects a position of the pointing object F in accordance with the change of the signal. Note that, at this time, the drive electrode 11a is positioned between the pointing object F and a pressure detecting electrode 21a. Hence, the drive electrode 11a functions as a shielding material, and the capacitance Cc between the drive electrode 11a and the pressure detecting electrode 21a (the pressure detecting unit 61) hardly changes.

Moreover, as illustrated in FIG. 3, when the pointing object F presses the cover member the pressure-sensitive layer 4 is depressed, and a distance between the drive electrode 11a and the pressure detecting electrode 21a (the pressure detecting unit 61) decreases. As a result, the capacitance Cc between the drive electrode 11a and the pressure detecting electrode 21a increases, and a signal detected by the pressure detecting electrode 21a (the pressure detecting unit 61) changes. Then, in accordance with the change of the signal (a pressure signal) to be detected by the pressure detecting electrode 21a, the touch panel controller 3 detects a magnitude of the pressure (a pressure value). Note that, when the touch panel 1 is pressed, the distance between the drive floating electrode 11b and the position detecting electrode 21b decreases, and the capacitance Cb increases. At this time, a signal (a touch signal) from the position detecting electrode 21b increases. However, the touch signal is sufficiently larger than the pressure signal, and is hardly affected. Thus, when the drive electrode 11a is pressed with the pointing object F, the touch position can be detected highly precisely. Moreover, the detection electrode layer 21 is provided with the floating electrode 21d. Such a feature makes it possible to prevent an increase in the electrostatic capacitance Cd formed by the reference potential electrode 21c and the drive electrode 11a.

Figure 6:
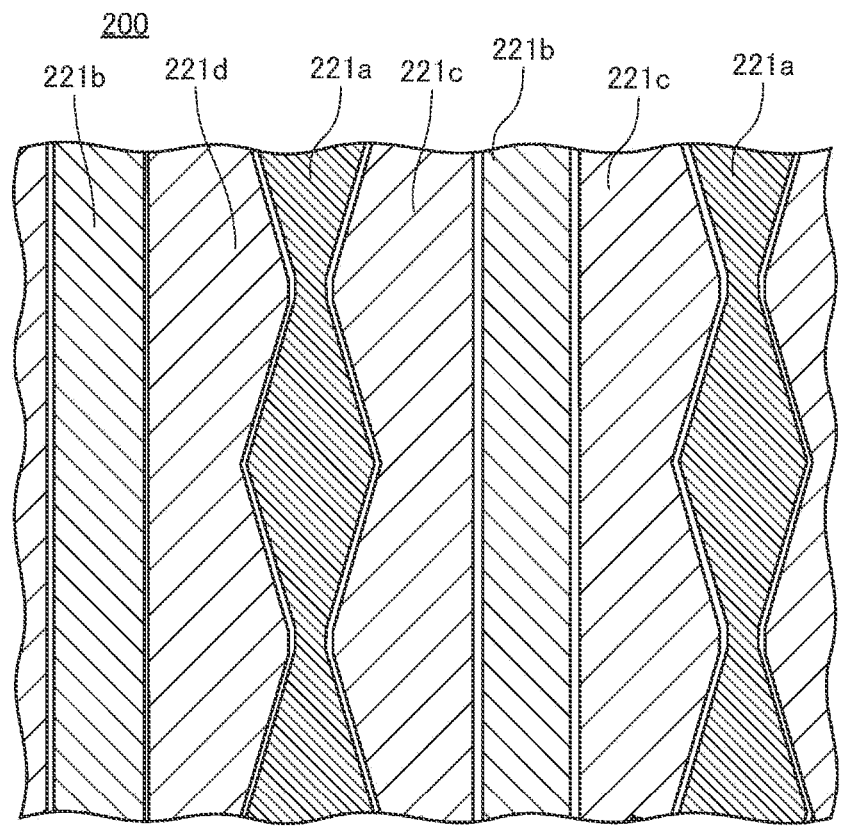
FIG. 6 is a view of a configuration of a display device 200 according to a first comparative example.

Result of Comparison Between Example of First Embodiment and First Comparative Example Next, with reference to FIGS. 5 to 8, a result of comparison is described between the display device 100 according to an example of the first embodiment and a display device 200 according to a first comparative example. Note that the display device 200 according to the first comparative example is configured to confirm advantageous effects of the display device 100 according to the example of the first embodiment. The display device 200 does not represent the prior art. FIG. 6 is a view of a configuration of the display device 200 according to the first comparative example.

The example of the first embodiment is the display device 100 including the detection electrode layer 21 illustrated in FIG. 5. Moreover, as illustrated in FIG. 6, the display device 200 includes: a pressure detecting electrode 221a; a position detecting electrode 221b; and a reference potential electrode 221c. In the first comparative example, the floating electrode 21d is replaced with the reference potential electrode 221c. The pressure detecting electrode 221a and the position detecting electrode 221b are respectively the same as the pressure detecting electrode 221a and the position detecting electrode 221b.

Figures 7, 8:
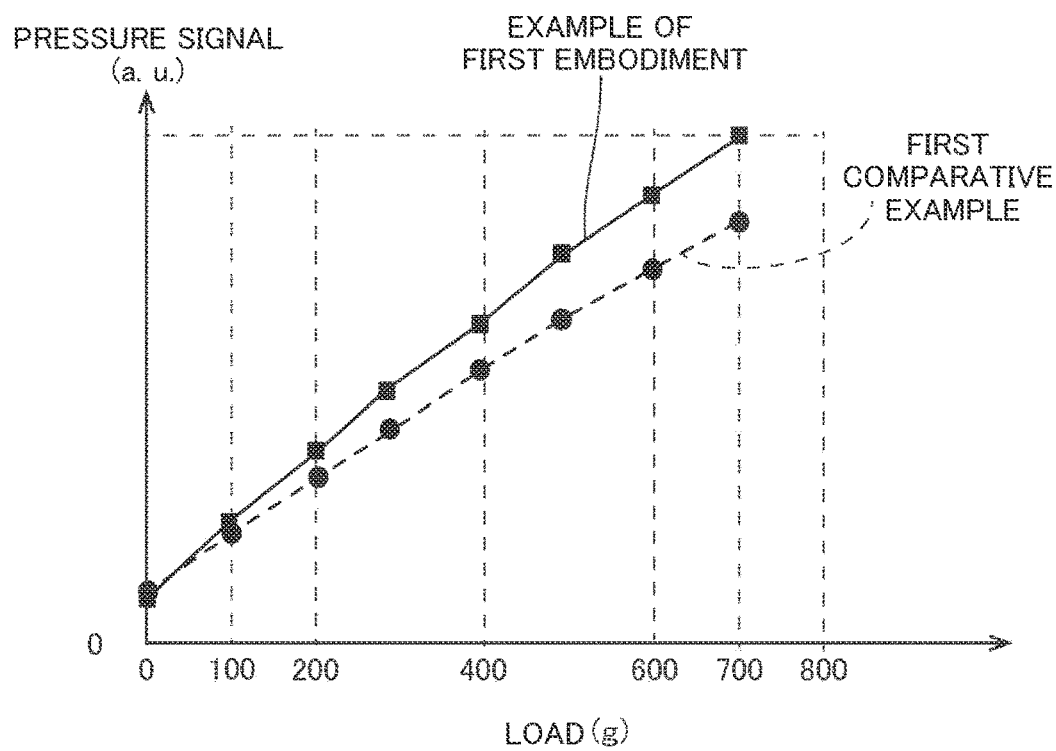
FIG. 7 is a table showing a result of comparison between the display device 100 according to an example of the first embodiment and the display device 200 according to the first comparative example.
FIG. 8 is a graph showing a result of comparison between the intensity of a signal from a pressure detecting electrode 21a according to an example of the first embodiment and the intensity of a signal from a pressure detecting electrode according to the first comparative example.

FIG. 7 is a table showing a result of comparison between the display device 100 according to the example of the first embodiment and the display device 200 according to the first comparative example. As to each of the display device 100 according to the example of the first embodiment and the display device 200 according to the first comparative example, a value of the electrostatic capacitance Cb between the drive electrode and the position detecting electrode, a value of the electrostatic capacitance Cc between the drive electrode and the pressure detecting electrode, and a value of the electrostatic capacitance Cd between the drive electrode and the reference potential electrode were measured. The electrostatic capacitance Cb was 0.8 pF in the example of the first embodiment, compared with 0.7 pF in the first comparative example. The electrostatic capacitance Cc was 1.4 pF in the example of the first embodiment, compared with 1.0 pF in the first comparative example. The electrostatic capacitance Cd was 2.4 pF in the example of the first embodiment, compared with 3.9 pF in the first comparative example. The total of the electrostatic capacitances Cb to Cd was 4.6 pF in the example of the first embodiment, compared with 5.6 pF in the first comparative example.

That is, the (total) electrostatic capacitance of the drive electrode 11a and electrodes formed in the detection electrode layer 21 according to the example of the first embodiment is smaller than that according to the first comparative example. Moreover, the electrostatic capacitances Cb and Cc in the example of the first embodiment were respectively larger than the electrostatic capacitances Cb and Cc in the first comparative example.

FIG. 8 is a graph showing a result of comparison between the intensity of a signal from a pressure detecting electrode 21a according to the example of the first embodiment and the intensity of a signal from a pressure detecting electrode according to the first comparative example. A load was applied to each of the cover member 5 according to the example of the first embodiment and a cover member of the first comparative example, and the intensity of the signal from the pressure detecting electrode was measured. The measurement result shows that, when the load is 100 g or more and 700 g or less, the intensity of the signal according to the example of the first embodiment was larger than that according to the first comparative example. Hence, the measurement result shows that sensitivity in detecting pressure according to the example of the first embodiment is higher than that according to the first comparative example.

Second Embodiment

Figure 9:
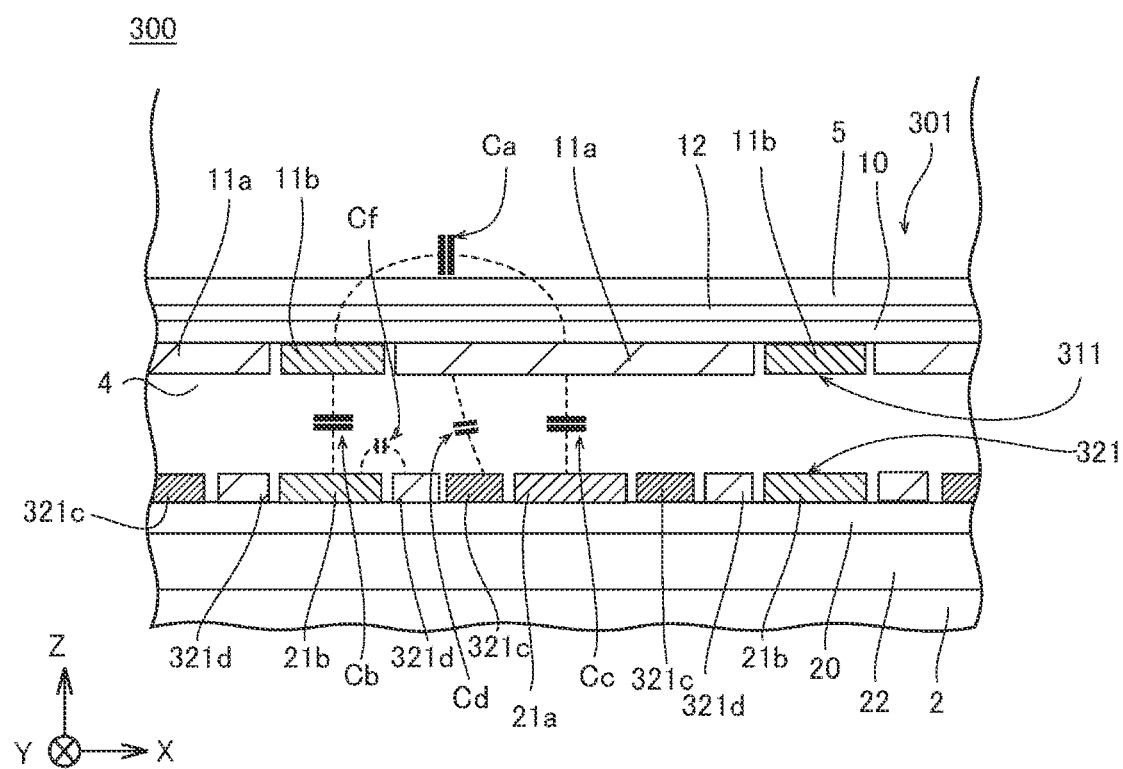
FIG. 9 is a cross-sectional view of a touch panel 301 included in a display device 300 according to a second embodiment.
Figure 10:
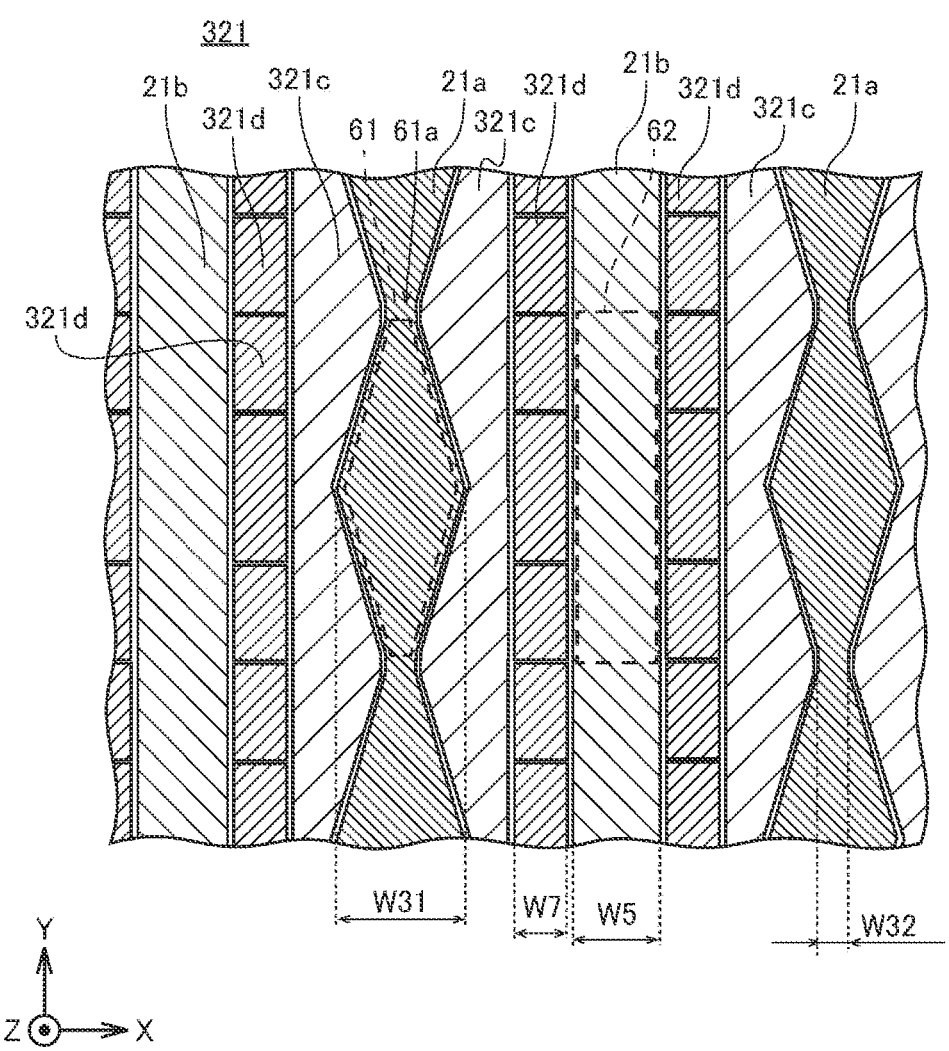
FIG. 10 is a plan view of a portion of a detection electrode layer 321 according to the second embodiment.

Next, with reference to FIGS. 9 and 10, a configuration of a display device 300 according to a second embodiment will be described. In the second embodiment, a floating electrode 321d is disposed between a position detecting electrode 21b and a reference potential electrode 321c. FIG. 9 is a cross-sectional view of a touch panel 301 included in the display device 300 according to the second embodiment. FIG. 10 is a plan view of a portion of a detection electrode layer 321 according to the second embodiment. Note that the same components as those of the first embodiment are denoted by the same reference signs as those of the first embodiment, and descriptions thereof are omitted.

As illustrated in FIG. 9, the display device 300 includes the touch panel 301. The touch panel 301 includes the reference potential electrode 321c and the floating electrode 321d. The reference potential electrode 321c is included in the detection electrode layer 321 and disposed between the floating electrode 321d and the pressure detecting electrode 21a. The reference potential electrode 321c is connected to the ground, and has the potential of the ground. At least a portion of the floating electrode 321d is positioned to overlap with a drive electrode 11a in plan view. In addition, at least a portion of the floating electrode 321d is positioned not to overlap with a drive floating electrode 11b in plan view. The floating electrode 321d and the position detecting electrode 21b form an electrostatic capacitance Cf of a fringe component.

As illustrated in FIG. 10, each of a plurality of the floating electrodes 321d is shaped into a rectangle in plan view. Moreover, the plurality of floating electrodes 321d are arranged side by side in the Y-direction. The plurality of floating electrodes 321d are not connected to each other. A width W7 of each floating electrode 321d is smaller than, for example, a width W5 of each position detecting electrode 21b. Furthermore, the width W7 is, for example, smaller than a width W31; that is, the largest width of the pressure detecting electrode 21a, and larger than a width W32; that is, the smallest width of the pressure detecting electrode 21a.

According to the configuration of the second embodiment, the reference potential electrode 321c is disposed toward the pressure detecting electrode 21a with respect to the floating electrode 321d. Such a feature makes it possible to keep the reference potential electrode 321c from decreasing the intensity of a signal from the position detecting electrode 21b. As a result, the feature can reduce a difference between the intensity of the signal from the pressure detecting electrode 21a and the intensity of the signal from the position detecting electrode 21b. As a result, the intensity of the signal from the pressure detecting electrode 21a and the intensity of the signal from the position detecting electrode 21b can be easily adjusted on the touch panel controller. Note that other configurations and the advantageous effects are the same between the second embodiment and the first embodiment.

Result of Comparison Between Example of Second Embodiment and First Comparative Example Next, with reference to FIG. 11, a result of comparison is described between the display device 300 according to an example of the second embodiment and the display device 200 according to the first comparative example.

The example of the second embodiment is the display device 300 illustrated in FIGS. 9 and 10. FIG. 11 is a table showing the result of comparison between the display device 300 according to the example of the second embodiment and the display device 200 according to the first comparative example. As to each of the display device 300 according to the example of the second embodiment and the display device 200 according to the first comparative example, a value of the electrostatic capacitance Cb between the drive electrode and the position detecting electrode, a value of the electrostatic capacitance Cc between the drive electrode and the pressure detecting electrode, and a value of the electrostatic capacitance Cd between the drive electrode and the reference potential electrode were measured. The electrostatic capacitance Cb was 1.1 pF in the example of the second embodiment, compared with 0.7 pF in the first comparative example. The electrostatic capacitance Cc was 1.1 pF in the example of the second embodiment, compared with 1.0 pF in the first comparative example. The electrostatic capacitance Cd was 2.7 pF in the example of the second embodiment, compared with 3.9 pF in the first comparative example. The total of the electrostatic capacitances Cb to Cd was 4.9 pF in the example of the second embodiment, compared with 5.6 pF in the first comparative example.

That is, the (total) electrostatic capacitance of the drive electrode 11a and electrodes formed in the detection electrode layer 321 according to the example of the second embodiment is smaller than that according to the first comparative example. Moreover, in the example of the second embodiment, the difference between the electrostatic capacitances Cb and Cc is 0 pF, which is lower than 0.3 pF in the first comparative example. That is, in the example of the second embodiment, a difference between the intensity of the signal from the pressure detecting electrode 21a and the intensity of the signal from the position detecting electrode 21b is reduced.

Third Embodiment

Figure 12:
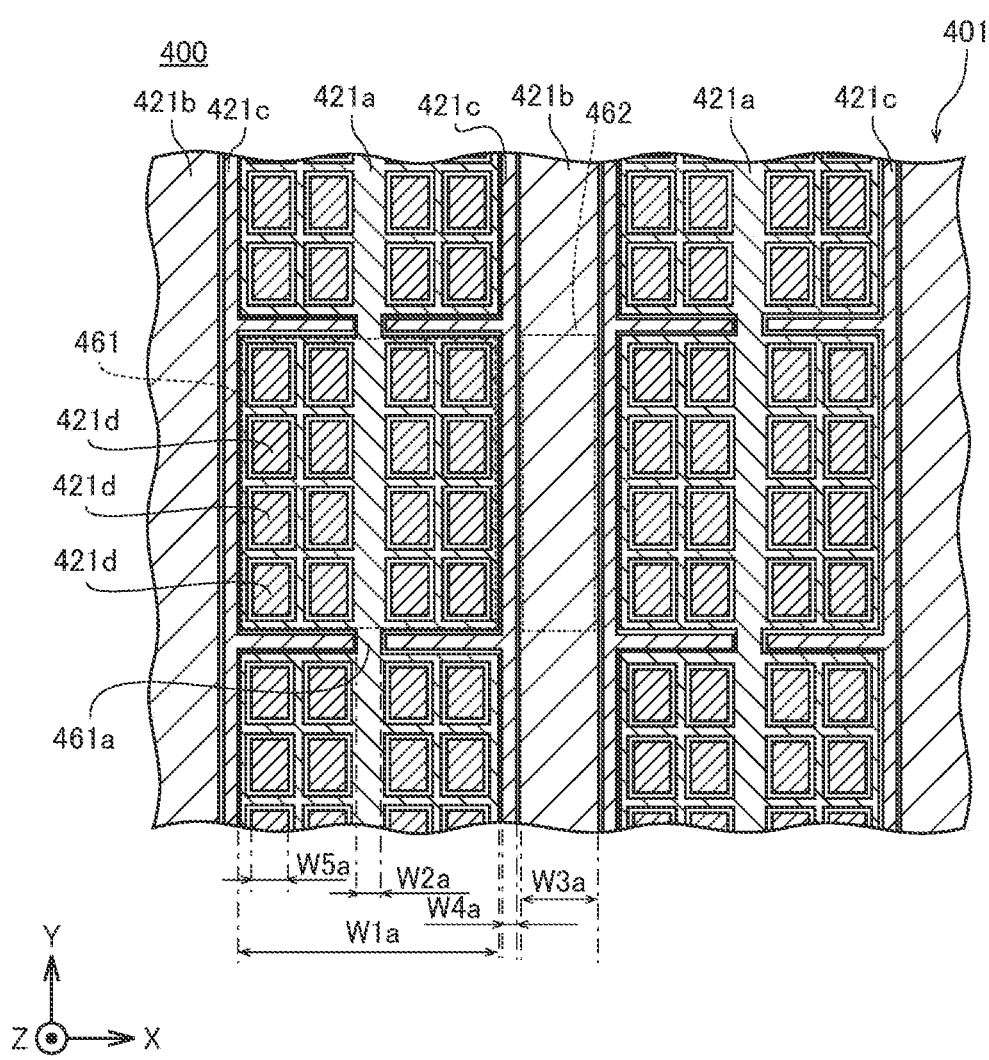
FIG. 12 is a plan view of a portion of a display device 400 according to a third embodiment.

Next, with reference to FIG. 12, a configuration of a display device 400 according to a third embodiment will be described. In the third embodiment, a floating electrode 421d is surrounded with a pressure detecting electrode 421a in plan view. FIG. 12 is a plan view of a portion of the display device 400 according to the third embodiment. Note that the same components as those of the first or second embodiment are denoted by the same reference signs as those of the first or second embodiment, and descriptions thereof are omitted.

As illustrated in FIG. 12, the display device 400 includes a touch panel 401. The touch panel 401 includes: a pressure detecting electrode 421a; a position detecting electrode 421b; a reference potential electrode 421c; and a floating electrode 421d. The pressure detecting electrode 421a includes a plurality of pressure detecting units 461. Each of the plurality of pressure detecting units 461 is shaped into a rectangle in plan view. The plurality of pressure detecting units 461 are connected to each other through a connection portion 461a. A width W2a of the connection portion 461a in the X-direction is smaller than a width W1a of the pressure detecting electrode 421a in the X-direction.

The position detecting electrode 421b has a constant width in the X-direction; namely, a width W3a. The position detecting electrode 421b extends in the Y-direction. Moreover, the width W3a is smaller than the width W1a of the pressure detecting electrode 421a in the X-direction. Furthermore, the reference potential electrode 421c is formed between the pressure detecting electrode 421a and the position detecting electrode 421b in the X-direction. In addition, the reference potential electrode 421c is disposed between the plurality of pressure detecting units 461 in the Y direction. A width W4a of the reference potential electrode 421c in the X-direction is smaller than the width W1a of the pressure detecting electrode 421a. The width W4a is smaller than the width W3a of the position detecting electrode 421b.

Moreover, the pressure detecting units 461 have holes formed in a matrix in plan view. Each of a plurality of the floating electrodes 421d is disposed in a corresponding one of the plurality of holes formed in the pressure detecting units 461. Thus, the plurality of floating electrodes 421d are arranged in a matrix in plan view, and surrounded with the pressure detecting electrode 421a. For example, 16 (four lows by four columns) floating electrodes 421d are arranged in one pressure detecting unit 461. Each of the floating electrodes 421d has a width W5a in the X-direction. The width W5a is larger than the width W4a and the width W2a. Furthermore, the width W5a is smaller than the width W3a.

Thanks to the configuration of the third embodiment, the floating electrodes 421d can reduce the electrostatic capacitance between the drive electrodes and the electrodes formed in the detection electrode layer. Moreover, the floating electrodes 421d are formed in the pressure detecting electrode 421a. Such a feature makes it possible to reduce the intensity of a signal from a pressure detecting electrode, and to reduce a difference between the intensity of the signal from the pressure detecting electrode and the intensity of the signal from a position detecting electrode. Note that other configurations and the advantageous effects are the same between the third embodiment and the first and second embodiments.

Figure 13:
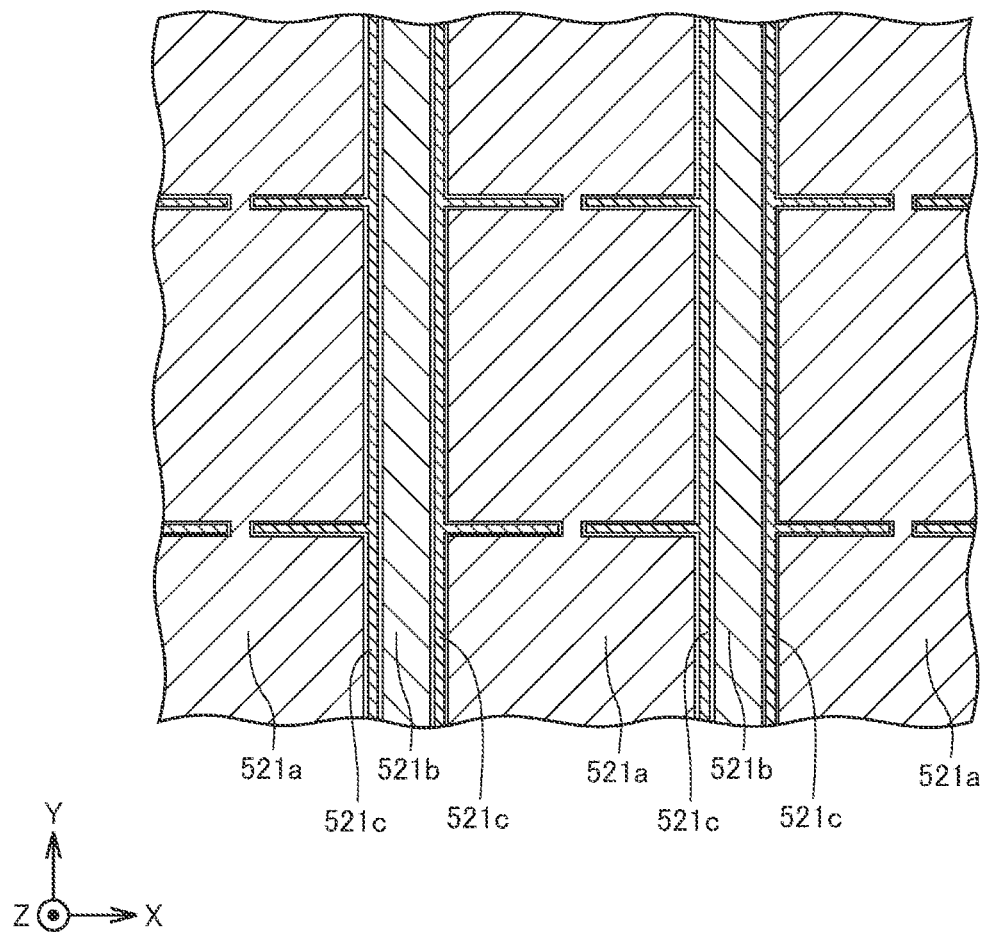
FIG. 13 is a view of a configuration of a display device 500 according to a second comparative example.

Result of Comparison Between Example of Third Embodiment and Second Comparative Example Next, with reference to FIGS. 13 and 14, a result of comparison is described between the display device 400 according to an example of the third embodiment and a display device 500 according to a second comparative example. Note that the display device 500 according to the second comparative example is configured to confirm advantageous effects of the display device 400 according to the example of the third embodiment. The display device 500 does not represent the prior art. FIG. 13 is a view of a configuration of the display device 500 according to the second comparative example.

The example of the third embodiment is the display device 400 illustrated in FIG. 12. Moreover, as illustrated in FIG. 13, the display device 500 includes: a pressure detecting electrode 521a; a position detecting electrode 521b; and a reference potential electrode 521c. In the second comparative example, the floating electrodes 421d are omitted, and an area corresponding to the floating electrodes 421d is provided with the pressure detecting electrode 521a. The position detecting electrode 521b and the reference potential electrode 521c are configured respectively in the same manner as the position detecting electrode 421b and the reference potential electrode 421c.

FIG. 14 is a table showing the result of comparison between the display device 500 according to the example of the third embodiment and the display device 400 according to the second comparative example. As to each of the display device 500 according to the example of the third embodiment and the display device 400 according to the second comparative example, a value of the electrostatic capacitance Cb between a drive electrode and the position detecting electrode, a value of the electrostatic capacitance Cc between the drive electrode and the pressure detecting electrode, and a value of the electrostatic capacitance Cd between the drive electrode and the reference potential electrode were measured. The electrostatic capacitance Cb was 0.8 pF in the example of the third embodiment, compared with 0.8 pF in the second comparative example. The electrostatic capacitance Cc was 2.4 pF in the example of the third embodiment, compared with 4.6 pF in the second comparative example. The electrostatic capacitance Cd was 0.2 pF in the example of the third embodiment, compared with 0.2 pF in the second comparative example. The total of the electrostatic capacitances Cb to Cd was 3.4 pF in the example of the third embodiment, compared with 5.6 pF in the second comparative example.

That is, the (total) electrostatic capacitance of the drive electrode 11a and electrodes formed in a detection electrode layer according to the example of the third embodiment is smaller than that according to the second comparative example. Moreover, in the example of the third embodiment, the difference between the electrostatic capacitances Cb and Cc is 1.6 pF, which is lower than 3.8 pF in the first comparative example. That is, in the example of the third embodiment, a difference between the intensity of a signal from the pressure detecting electrode 421a and the intensity of a signal from the position detecting electrode 421b is reduced.

Modifications

The embodiments described above are mere examples for implementing the present disclosure. Therefore, the present disclosure shall not be limited to the above embodiments, and the above embodiments can be appropriately modified and implemented unless otherwise departing from the scope of the present disclosure.

(1) The first to third embodiments show an example in which the floating electrode and the drive electrode are positioned to overlap with each other in plan view. However, the present disclosure shall not be limited to such an example. That is, only a portion of the floating electrode may be positioned to overlap with the drive electrode in plan view. Alternatively, the floating electrode may be positioned not to overlap with the drive electrode in plan view.

(2) The first to third embodiments show an example in which the pressure detecting unit is shaped into a rectangle or a hexagon, the position detecting unit is shaped into a rectangle, and the floating electrode is shaped into a rectangle or a trapezoid. However, the present disclosure shall not be limited to such an example. For example, any of the pressure detecting unit, the position detecting unit, and the floating electrode may be shaped into a circle or a polygon.

(3) The first to third embodiments show an example in which the potential of the reference potential electrode is the potential of the ground. However, the present disclosure shall not be limited to such an example. For example, the potential of the reference potential electrode may be set to a predetermined constant potential different from the potential of the ground.

(4) The first to third embodiments show an example in which the direction in which the plurality of drive electrodes are arranged (the Y-direction) is orthogonal to the direction in which the plurality of pressure detecting electrodes are arranged (the X-direction). However, the present disclosure shall not be limited to such an example. For example, the direction in which the plurality of drive electrodes are arranged may intersect with the direction in which the plurality of pressure detecting electrodes are arranged at an angle of less than 90°.

(5) The first to third embodiments show an example in which the drive electrodes, the drive floating electrodes, the pressure detecting electrodes, the position detecting electrodes, and the floating electrodes are made of ITO. However, the present disclosure shall not be limited to such an example. For example, the drive electrodes, the drive floating electrodes, the pressure detecting electrodes, the position detecting electrodes, and the floating electrodes may be made of a conductive metal material.

(6) The first to third embodiments show an example in which the touch panel is provided with the drive floating electrodes. However, the present disclosure shall not be limited to such an example. That is, the touch panel may omit the drive floating electrodes.

(7) The first to third embodiments show an example in which the touch panel is provided to the display device. However, the present disclosure shall not be limited to such an example. That is, the touch panel of the present disclosure may be provided to a device having no display unit.

The above capacitive touch panel and display device can also be described as follows.

A capacitive touch panel according to a first configuration detects: a position included in a touch surface and touched with a pointing object; and pressure applied on the touch surface with the pointing object. The capacitive touch panel includes: a drive electrode supplied with a drive signal; a detection electrode disposed across the drive electrode from the touch surface, and including a position detecting electrode that detects the position included in the touch surface and touched with the pointing object, and a pressure detecting electrode that detects the pressure applied on the touch surface with the pointing object; and a floating electrode having a floating potential. The position detecting electrode, the pressure detecting electrode, and the floating electrode are formed in a layer (a first configuration).

According to the first configuration, the floating electrode having a floating potential is formed in the same layer as the layer in which a detection electrode is formed. Between the drive electrode and the floating electrode, an electrostatic capacity is less likely to be formed. Hence, even if the capacitive touch panel has a pressure detecting function, such a feature makes it possible to prevent the electrostatic capacity from increasing between the drive electrode and an electrode that is formed in the layer in which a detection electrode is formed.

In the first configuration, at least a portion of the floating electrode may be positioned to overlap with the drive electrode in plan view (a second configuration).

Here, the drive electrode and an electrode, which is included in the detection electrode layer and positioned to overlap with the drive electrode in plan view, form a parallel plate capacitor. On the other hand, the drive electrode and an electrode, which is included in the detection electrode layer and positioned at least partially not to overlap with the drive electrode, form an electrostatic capacitance (an electrostatic capacitance of a fringe component) between an end portion of the drive electrode and an end portion of the electrode included in the detection electrode layer. An electrostatic capacitance formed by the parallel plate capacitor is larger than the electrostatic capacitance of the fringe component. Thanks to the second configuration, at least a portion of an electrode, which is included in the detection electrode layer and positioned to overlap with the drive electrode in plan view, acts as the floating electrode. Such a feature can reduce the size of the parallel plate capacitor. As a result, the feature can prevent an increase in the electrostatic capacitance between the drive electrode and the electrode that is formed in the detection electrode layer.

In the first or second configuration, the capacitive touch panel may further include a drive floating electrode formed in a same layer as the drive electrode is formed, and having the floating potential. The position detecting electrode may be positioned to overlap with the drive floating electrode in plan view, and the floating electrode may be positioned not to overlap with the drive floating electrode in plan view (a third configuration).

Here, at least a portion of the position detecting electrode is positioned not overlap with the drive electrode in plan view, in order to be capacitively coupled to the pointing object. Hence, between an end portion of the drive electrode and the position detecting electrode, an electrostatic capacitance due to a fringe component is formed. However, an electrostatic capacitance of the parallel plate capacitor formed of the pressure detecting electrode and the drive electrode is larger than the electrostatic capacitance, due to the fringe component, formed between the position detecting electrode and the drive electrode. Hence, the intensity of a signal from the pressure detecting electrode is larger than the intensity of a signal from the position detecting electrode, so that the adjustment is complex between the intensity of the signal from the pressure detecting electrode and the intensity of the signal from the position detecting electrode. Thanks to the third configuration, the drive electrode and the drive floating electrode are capacitively coupled together, and the drive floating electrode and the position detecting electrode are capacitively coupled together. Thanks to such a feature, even if the drive electrode and the position detecting electrode are positioned not to overlap with each other in plan view, the drive electrode and the position detecting electrode can form an electrostatic capacitance through the drive floating electrode. As a result, the feature can increase the intensity of a signal for detecting the touch position based on the electrostatic capacitance. Moreover, the floating electrode is positioned not to overlap with the drive floating electrode in plan view. Thus, the position detecting electrode, which is positioned to overlap with the drive floating electrode in plan view, can be formed large in size. These features make it possible to reduce a difference between the intensity of a signal from the pressure detecting electrode and the intensity of a signal from the position detecting electrode, so that the adjustment can be simplified between the intensity of the signal from the pressure detecting electrode and the intensity of the signal from the position detecting electrode.

In the first or second configuration, the capacitive touch panel may further include: a drive floating electrode formed in a same layer as the drive electrode is formed, and having the floating potential; and a reference potential electrode connected to a reference potential (a fourth configuration).

Here, if the drive floating electrode and the pressure detecting electrode are capacitively coupled to each other, the capacitance inevitably changes just because when the pointing object touches the touch panel even if the capacitive touch panel is not pressed by the pointing object. In this case, it is difficult to distinguish the capacitance change caused merely by a touch of the pointing object from the capacitance change caused by a press of the pointing object. On the other hand, according to the fourth configuration, the reference potential electrode can prevent capacitive coupling between the drive floating electrode and the pressure detecting electrode. Hence, the drive electrode and the pressure detecting electrode exhibit the capacitance change only when the touch panel is pressed. As a result, the fourth configuration can accurately distinguish the capacitance change caused merely by a touch of the pointing object from the capacitance change caused by a press of the pointing object.

In any one of the first to fourth configurations, the capacitive touch panel may further include a reference potential electrode connected to a reference potential. In the layer in which the floating electrode is formed, the reference potential electrode may be disposed between the floating electrode and the position detecting electrode (a fifth configuration).

Thanks to the fifth configuration, the detection electrode layer is provided with the floating electrode. Such a feature makes it possible to prevent an increase in the electrostatic capacitance formed by the reference potential electrode and the drive electrode.

In any one of the first to fourth configurations, the capacitive touch panel may further include a reference potential electrode connected to a reference potential. In the layer in which the floating electrode is formed, the reference potential electrode may be disposed between the floating electrode and the pressure detecting electrode (a sixth configuration).

Thanks to the sixth configuration, the reference potential electrode is disposed toward the pressure detecting electrode with respect to the floating electrode. Such a feature makes it possible to reduce a decrease in the signal intensity from the position detecting electrode caused by the reference potential electrode. As a result, the feature can reduce a difference between the intensity of the signal from the pressure detecting electrode and the intensity of the signal from the position detecting electrode.

In any one of the first to fourth configurations, the floating electrode may be surrounded with the pressure detecting electrode in plan view (a seventh configuration).

Thanks to the seventh configuration, the floating electrode can reduce an electrostatic capacitance between the drive electrode and an electrode formed in the detection electrode layer. Moreover, the floating electrode is formed in the pressure detecting electrode. Such a feature makes it possible to reduce the intensity of a signal from the pressure detecting electrode, and to reduce a difference between the intensity of the signal from the pressure detecting electrode and the intensity of the signal from the position detecting electrode.

A display device according to an eighth configuration includes a capacitive touch panel that detects: a position included in a touch surface and touched with a pointing object; and pressure applied on the touch surface with the pointing object; and a display that displays an image. The capacitive touch panel includes: a drive electrode supplied with a drive signal; a detection electrode disposed across the drive electrode from the touch surface, and including a position detecting electrode that detects the position included in the touch surface and touched with the pointing object, and a pressure detecting electrode that detects the pressure applied on the touch surface with the pointing object; and a floating electrode having a floating potential. The position detecting electrode, the pressure detecting electrode, and the floating electrode are formed in a layer (an eighth configuration).

The eighth configuration makes it possible to provide a display device having a pressure detecting function capable of preventing an increase in electrostatic capacitance between the drive electrode and an electrode that is formed in the layer in which a detection electrode is formed.

The invention claimed is:

1. A capacitive touch panel that detects a position included in a touch surface and touched with a pointing object, and a pressure applied on the touch surface with the pointing object, the capacitive touch panel comprising:
 a drive electrode supplied with a drive signal;

a detection electrode disposed across the drive electrode from the touch surface, and including a position detecting electrode configured to detect the position included in the touch surface and touched with the pointing object, and a pressure detecting electrode configured to detect the pressure applied on the touch surface with the pointing object;

a floating electrode having a floating potential, the floating electrode not connected to another electrode, not connected to a voltage source, and not connected to ground; and a reference potential electrode having a reference potential, wherein the reference potential is equal to a potential of the ground, wherein the position detecting electrode, the pressure detecting electrode, and the floating electrode are formed in a layer, and in the layer, the position detecting electrode, the reference potential electrode, the floating electrode, and the pressure detecting electrode are disposed adjacent to each other in the mentioned order.

2. The capacitive touch panel according to claim 1, wherein at least a portion of the floating electrode is positioned to overlap with the drive electrode in a plan view.

3. The capacitive touch panel according to claim 2, further comprising:

a drive floating electrode formed in a same layer as the drive electrode is formed, and having the floating potential, wherein the position detecting electrode is positioned to overlap with the drive floating electrode in the plan view, and the floating electrode is positioned not to overlap with the drive floating electrode in the plan view.

4. The capacitive touch panel according to claim 1, further comprising:

a drive floating electrode formed in a same layer as the drive electrode is formed, and having the floating potential.

5. The capacitive touch panel according to claim 1, wherein the floating electrode is surrounded with the pressure detecting electrode in a plan view.

6. A capacitive touch panel that detects a position included in a touch surface and touched with a pointing object, and a pressure applied on the touch surface with the pointing object, the capacitive touch panel comprising:

a drive electrode supplied with a drive signal;

a detection electrode disposed across the drive electrode from the touch surface, and including a position detecting electrode configured to detect the position included in the touch surface and touched with the pointing object, and a pressure detecting electrode configured to detect the pressure applied on the touch surface with the pointing object;

a floating electrode having a floating potential, the floating electrode not connected to another electrode, not connected to a voltage source, and not connected to ground; and a reference potential electrode having a reference potential, wherein the reference potential is equal to a potential of the ground, wherein the position detecting electrode, the pressure detecting electrode, and the floating electrode are formed in a layer, and in the layer, the position detecting electrode, the floating electrode, the reference potential electrode, and the pressure detecting electrode are disposed adjacent to each other in the mentioned order.

7. A display device, comprising:

a capacitive touch panel configured to detect a position included in a touch surface and touched with a pointing object, and a pressure applied on the touch surface with the pointing object; and a display configured to display an image, wherein the capacitive touch panel includes:

a drive electrode supplied with a drive signal;

a detection electrode disposed across the drive electrode from the touch surface, and including a position detecting electrode configured to detect the position included in the touch surface and touched with the pointing object, and a pressure detecting electrode configured to detect the pressure applied on the touch surface with the pointing object;

a floating electrode having a floating potential, the floating electrode not connected to another electrode, not connected to a voltage source, and not connected to ground; and a reference potential electrode having a reference potential, wherein the reference potential is equal to a potential of the ground, the position detecting electrode, the pressure detecting electrode, and the floating electrode are formed in a layer, and in the layer, the position detecting electrode, the reference potential electrode the floating electrode, and the pressure detecting electrode are disposed adjacent to each other in the mentioned order.

* * * * *